Aug. 20, 1957  J. W. PEARCE  2,803,387
FISHING ROD HOLDER
Filed Sept. 28, 1954
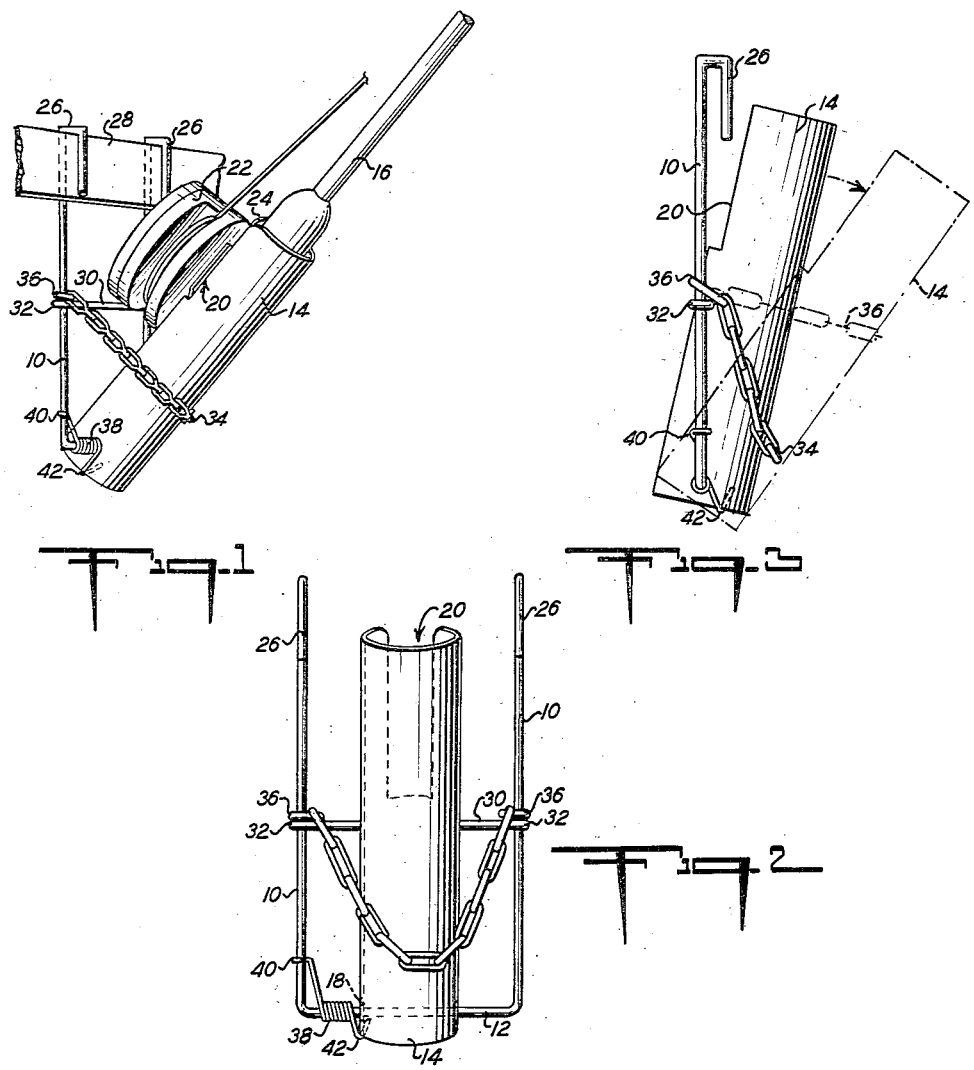
INVENTOR
JOHN W. PEARCE
BY *Parker and Walsh*
ATTORNEY

United States Patent Office 2,803,387
Patented Aug. 20, 1957

2,803,387

FISHING ROD HOLDER

John W. Pearce, Huntingdon, Pa.

Application September 28, 1954, Serial No. 458,864

1 Claim. (Cl. 224—5)

The present invention relates generally to the fishing art. More particularly, this invention is directed to an improved fishing accessory in the form of a fishing rod holder.

As is well understood by those skilled in the art, each type of fishing has its own peculiar difficulties and, in general, such problems ordinarily arise from the nature of the particular equipment and different techniques employed in accordance with the nature of the body of water in which the fishing takes place. In the simplest case, that is, when fishing in a small and relatively calm body of water from the bank thereof, a fixed pole and line with a baited hook, sinker and float may be employed and the pole with the line attached may be set down or propped in any convenient manner upon the ground whenever it is desired to have the hands free to accomplish other tasks. Although the equipment required is generally heavier and more complicated in the case of surf fishing or trolling from a boat, it is still true that the fishing pole and its associated equipment may be readily set aside or placed in the heavy sockets customarily provided for this purpose.

On the other hand, in fishing for game fish of the type most often found in relatively fast moving streams or the like, it is customary for the fisher to don hip boots or waders which may cover substantially the entire lower portion of his body and with such protection the actual fishing may be done a good distance away from the shore line. It naturally follows, however, that when wading the fisher finds it most convenient to carry with him most of the gear such as creel, hand net, plug or fly assortment, and similar items so that it will not be necessary to return to the shore frequently to pick up the same. It is highly important, therefore, that fishing accessories designed for use when wading be as simple and light weight as possible so that the fisher will not be unduly burdened with extra belts, slings, or heavy weight apparatus which, in the aggregate, would tend to materially reduce the pleasure to be derived from the sport.

From another standpoint, it will be equally apparent that when the fisher is engaged in wading at any considerable distance from the shore, there is no convenient place where he may temporarily lay his fishing rod aside as would be the case if he were on the shore, or in a boat or the like. Nevertheless, it is frequently necessary while wading to have both hands free as, for instance, when it is desired to change the plug or fly, unhook a catch, or perhaps even to light a cigarette.

It is, accordingly, a principal object of the present invention to provide a fishing accessory in the form of a fishing rod holder which may be readily attached to or detached from the usual clothing belt of the fisher and which, during wading or the like, may temporarily accommodate the butt or handle portion of a fishing rod to permit the fisher to have both hands free to accomplish other tasks.

Another important object of the present invention is to provide a fishing rod holder of the type described which is extremely simple and light weight in construction and which does not require the use of additional heavy belts or slings other than the conventional belt ordinarily worn about the waist by members of both sexes.

A further object of the invention is to provide a fishing rod holder of the type described in which the tube serving as the socket for receiving the butt or handle portion of the fishing rod is spring pressed against the frame to which it is pivotally attached so that it will tend to lie against the frame and against the body of the fisher in an unobtrusive manner at all times when it is not actually in use.

An additional object of the invention is to provide a fishing rod holder of the type described in which the rod holding socket or tube is provided with an elongated open slot in its upper rear portion of sufficient width to receive the usual mounting bracket for a fly casting reel so that the same holder is equally adapted to receive either a bait casting rod with its forwardly mounted reel or a fly casting rod in which the reel is generally mounted much closer to the extreme bottom end of the handle.

The foregoing together with other and further objects and advantages of the present invention will become more readily apparent to one skilled in the art from a consideration of the following detailed specification taken in conjunction with the accompanying figures of the drawing in which:

Figure 1 is a perspective view of a fishing rod holder in accordance with the present invention showing the same in operative position with the handle of a fly fishing rod mounted in the socket:

Figure 2 is a front elevational view of the fishing rod holder of Figure 1 but illustrating the same when not in use; and Figure 3 is a side elevational view of the fishing rod holder of Figure 2 in which one forward position of the rod holding tube is shown in dotted lines.

Referring now in somewhat greater detail to the various figures of the drawing, the improved fishing rod holder in accordance with the present invention is shown in all three views as comprising an upwardly open, generally U-shaped frame 10 preferably formed of a stiff metal wire having sufficient rigidity to retain its shape after bending but at the same time being as light in weight as possible. At its lower end, the frame 10 is provided with a transverse portion 12 on which is pivotally mounted a tube 14 which constitutes the actual socket for the reception of the butt or handle portion of the fishing rod 16 as illustrated in Figure 1. The tube 14 is open at both ends and, as shown in Figure 2, the transverse portion 12 of the wire frame 10 preferably extends clear through both sides of the tube 14 adjacent its bottom end along a diameter of the circular cross-section of the tube. The tube 14, in practice, may be formed of any suitable light weight metal or plastic and the wire frame may be inserted through suitable apertures 18 (Fig. 2) at a suitable intermediate stage in the fabrication of the device Although the tube 14 itself is actually open at both ends, it will be noted that the effect of extending the transverse portion 12 of the wire frame 10 diametrically across the lower portion of the tube between the apertures 18 is to provide an abutment which serves to limit the maximum downward penetration of a fishing rod 16 through the tube. In this way, if the fishing rod 16 is of sufficiently small diameter and its reel is located sufficiently far forward, the extreme lower end of the rod will not extend downwardly through the bottom of the tube 14 to press undesirably against the fisher.

At its upper end, the tube 14 is provided with an elongated open slot 20 (Fig. 2) extending longitudinally downward in the upper rear wall of the tube from the open top end of the latter. It will be particularly noted that the slot 20 possesses a substantial width and is therefore of sufficient size to accommodate the usual reel mounting brackets of a fly fishing rod. The size of the slot 20 is probably best illustrated in Figure 2 of the drawing while in Figure 1 there is shown a typical case in which the fishing rod 16 is provided with a fly casting reel 22, the mounting bracket for which is partially illustrated at 24.

As shown also in Figure 1 and in Figure 3, the upper end portions of the wire frame 10 are bent downwardly so as to provide a pair of hooks 26 which may be engaged with the usual clothing belt 28 of the fisher. The frame 10, as shown in Figures 1 and 2, is also provided with a wire brace 30, the opposite ends 32 of which are preferably wound around and firmly secured in any convenient manner as by welding, brazing, soldering, or the like, to the opposite sides of the frame 10 so that the brace 30 extends generally transversely across the central portion of the frame. It will be apparent from each of the figures of the drawing that the brace 30 lies generally rearward of the tube 14 so that, in effect, it constitutes an inner limit stop against further inward rotation of the tube 14 relative to the frame 10.

As is also relatively clearly illustrated in each of the three figures of the drawing, the tube 14 is surrounded by a chain 34 which is flexible and which is preferably formed of lightweight links of any suitable metal. The end links 36 of the chain 34 are respectively connected to the opposite sides of the frame 10 and, in the interests of simplicity, these end links 36 may be simply slid over the hooks 26 at the top ends of the frame 10 after the brace 30 has been firmly positioned in place so that the end links 36 will merely rest upon the respective ends 32 of the brace 30 and will be prevented by the latter from slipping further downwardly along the sides of the frame 10. It will be apparent that the chain 34, lying as it does forwardly of the tube 14, will serve to provide an outer limit stop beyond which the tube 14 may not rotate relative to the frame 10.

As is perhaps best illustrated in Figure 2, the transverse portion 12 of the frame 10 is provided with a coil spring 38 wound thereabout at one side of the tube 14. At its outer end, the coil spring 38 is provided with a hook portion 40 which is firmly secured to one of the sides of the frame 10. At its inner portion the coil spring 38 is bent upwardly to provide a hook portion 42 extending upwardly within the lower open end of the tube 14 in firm engagement with the latter. It will be understood that the coil spring 38 is suitably tensioned during assembly in such manner as to resiliently or yieldingly urge the tube 14 into the position as illustrated in solid lines in Figure 3 and, upon relative rotation between the tube 14 and frame 10 within the limiting positions provided by the brace 30 and the chain 34, the coil spring 38 will, at all times, tend to urge the tube 14 to return to its position as shown in solid lines in Figure 3.

*Operation*

It is believed that the operation of the fishing rod holder, in accordance with the present invention, will be readily apparent to those skilled in the art from the description which has already been given. Briefly, however, as shown in Figure 1, the frame 10 has been attached to the ordinary clothing belt 28 of the fisher by inserting the upper ends of the frame upwardly behind the belt 28 and thence forwardly and downwardly to engage the hooks 26 with the belt. While the accessory is being worn, the tube 14 will be urged upwardly by the coil spring 38 in such manner as to lie relatively flat or at least in an unobtrusive position against the body of the user. At the same time, the chain 34, being flexible, will tend to drop downwardly against the lower portion of the tube 14 as shown in Figure 3, thereby further tending to maintain a substantially minimum overall thickness of the complete assembly. It will also be understood that, whether in use or in a standby condition, the coil spring 38 will likewise serve to hold the tube 14 in a generally central position with respect to the transverse portion 12 of the frame 10.

With the fishing rod holder attached to the belt of the user in the manner just described, if it should become desirable to employ both hands for any of a number of purposes, some of which have been previously mentioned herein, the butt or handle portion of the fishing rod 16 may be simply inserted through the open top end of the tube 14 and slid downwardly within the latter until the extreme bottom end of the rod 16 contacts the transverse portion 12 of the frame 10 which extends diametrically across the bottom end of the tube 14. In the case of a bait casting or plug casting rod, as is generally understood by those skilled in the art, the reel is mounted sufficiently far forwardly along the handle of the rod so that the slot 20 is not actually necessary. On the other hand, the spring type reel customarily employed in fly casting is generally located much closer to the extreme butt end of the fishing rod and, in such case, the effectiveness of the slot 20 comes into play and the reel 22 and its mounting brackets 24 may be accommodated by the slot in the manner as illustrated in Figure 1.

When the device is in use, the weight of the fishing rod 16 will cause the tube 14 to pivot or rotate a slight distance forwardly about the transverse portion 12 of the frame 10 as illustrated in Figure 1. In this position the chain 34 serves as a limit stop preventing further forward rotation of the tube 14 and its supported rod 16 relative to the frame 10. The fishing rod is thus held out of contact with the water while the hands are free to accomplish other tasks and as soon as the fishing rod 16 is removed from the socket provided by the tube 14, the coil spring 38 will immediately return the tube 14 to its flat position, as shown in full lines in Figure 3.

While I have disclosed a preferred embodiment of the present invention solely for purposes of illustration, it will be obvious that numerous modifications, alterations and deviations from the specific form of the device illustrated in the drawing will occur to those skilled in the art without departing from the spirit or scope of the invention as defined in the following claim.

I claim:

A fishing rod holder for the temporary accommodation of the butt or handle portion of a fishing rod and adapted to be removably attached to the usual clothing belt of the fisher during wading or the like comprising an upwardly open, generally U-shaped wire frame having its upper end portions bent downwardly to provide hooks engageable with said belt, an open-ended tube pivotally mounted adjacent its lower end on the transverse portion of said frame with the latter extending diametrically therethrough, a coil spring surrounding the transverse portion of said frame at one side of said tube and having one end bent upwardly within the lower open end of the latter and the other end connected to one of the longitudinal sides of said frame, a wire brace connected to the opposite sides of said frame and extending transversely across the central portion of the frame to provide an inner limit stop for said tube, and a chain having its end links respectively connected to the opposite sides of said frame above said brace and surrounding said tube to provide an outer limit stop for the latter, said tube being provided with an elongated open slot extending longitudinally downward in the upper rear wall of said tube from its top open end of sufficient width for the accommodation of a fly fishing reel mounting bracket therein.

References Cited in the file of this patent

UNITED STATES PATENTS

| 1,373,003 | Hoffman | Mar. 29, 1921 |
| 2,576,624 | Miller | Nov. 27, 1951 |
| 2,658,650 | Jasper | Nov. 10, 1953 |